No. 768,106. PATENTED AUG. 23, 1904.
E. T. WILLIAMS.
ROTARY CUTTER FOR HYDRAULIC DREDGES.
APPLICATION FILED DEC. 28, 1903.

NO MODEL. 3 SHEETS—SHEET 1.

Witnesses,
Inventor,
Ezra T. Williams,
By Offield, Towle & Linthicum
Attys.

No. 768,106. PATENTED AUG. 23, 1904.
E. T. WILLIAMS.
ROTARY CUTTER FOR HYDRAULIC DREDGES.
APPLICATION FILED DEC. 28, 1903.
NO MODEL. 3 SHEETS—SHEET 2.

No. 768,106. PATENTED AUG. 23, 1904.
E. T. WILLIAMS.
ROTARY CUTTER FOR HYDRAULIC DREDGES.
APPLICATION FILED DEC. 28, 1903.
NO MODEL. 3 SHEETS—SHEET 3.
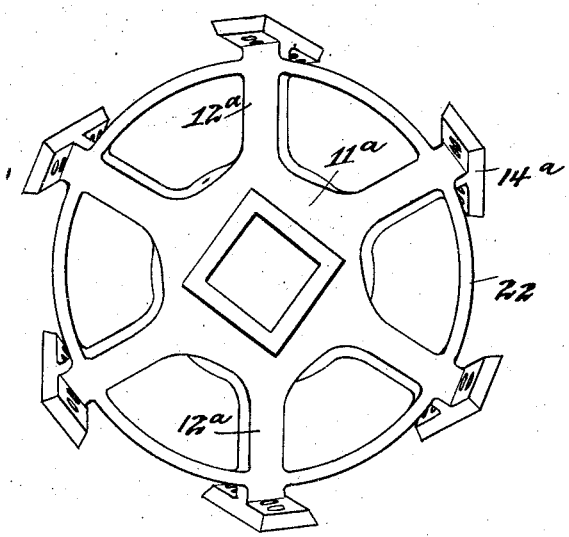
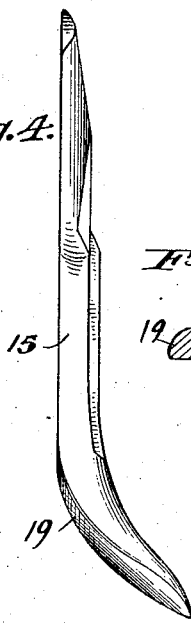
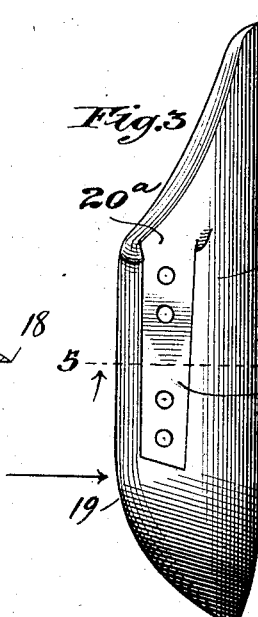
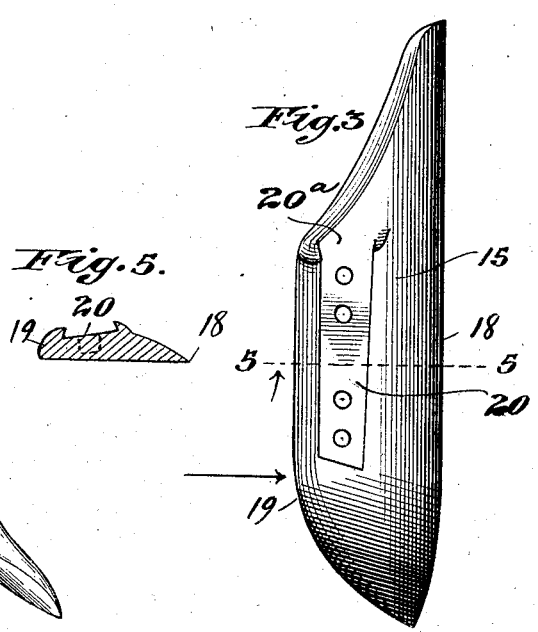
Witnesses,
Inventor,
Ezra T. Williams,
By Offield, Towle & Linthicum
Attys.

No. 768,106. Patented August 23, 1904.

UNITED STATES PATENT OFFICE.

EZRA T. WILLIAMS, OF DULUTH, MINNESOTA.

ROTARY CUTTER FOR HYDRAULIC DREDGES.

SPECIFICATION forming part of Letters Patent No. 768,106, dated August 23, 1904.

Application filed December 28, 1903. Serial No. 186,795. (No model.)

*To all whom it may concern:*

Be it known that I, EZRA T. WILLIAMS, a citizen of the United States, residing at Duluth, in the county of St. Louis and State of Minnesota, have invented certain new and useful Improvements in Rotary Cutters for Hydraulic Dredges, of which the following is a specification.

My invention relates to rotary cutters employed in hydraulic dredging apparatus, and has for its object to provide an improved cutter of the class referred to of increased efficiency as compared with cutters now in use, which increased efficiency I secure principally by means of a peculiar formation and disposition of the blades, whereby the cutter is rendered self-cleaning and automatically draws itself into the work.

A device embodying my present invention is illustrated in the accompanying drawings, wherein—

Figure 1:
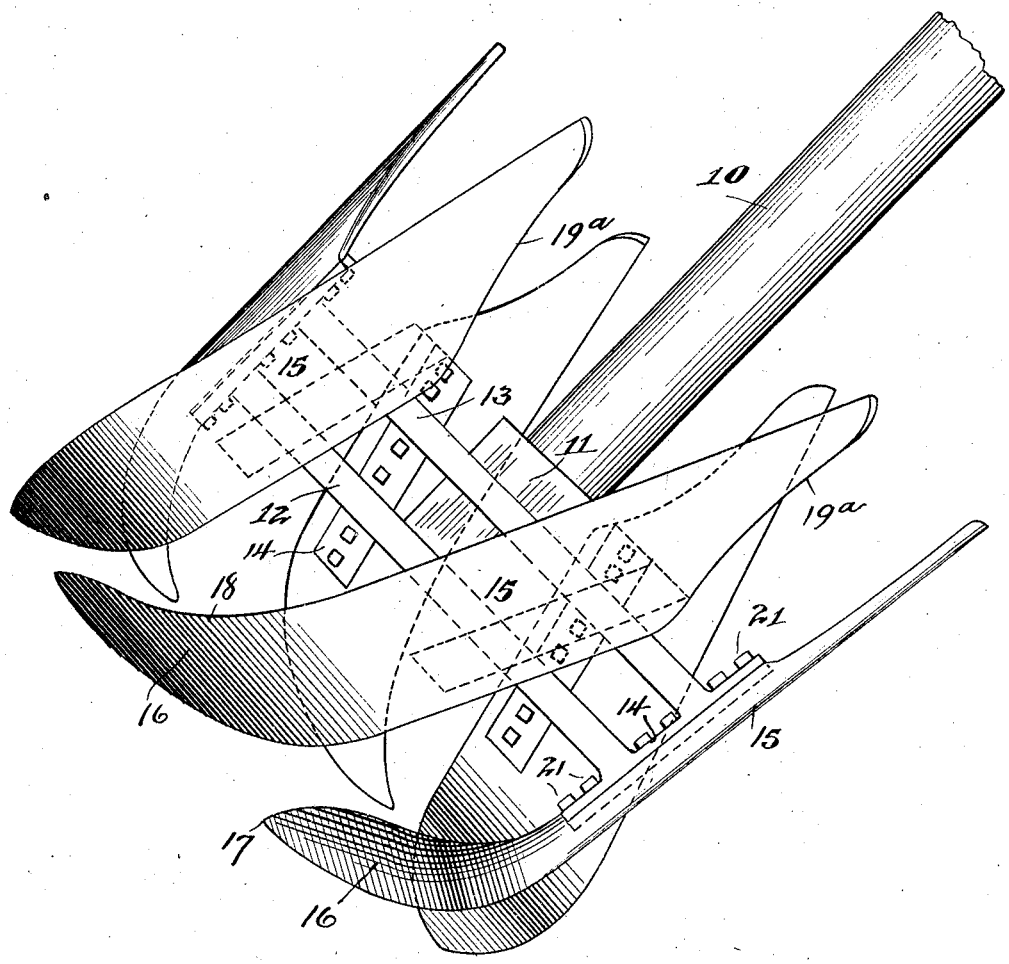
Figure 2:
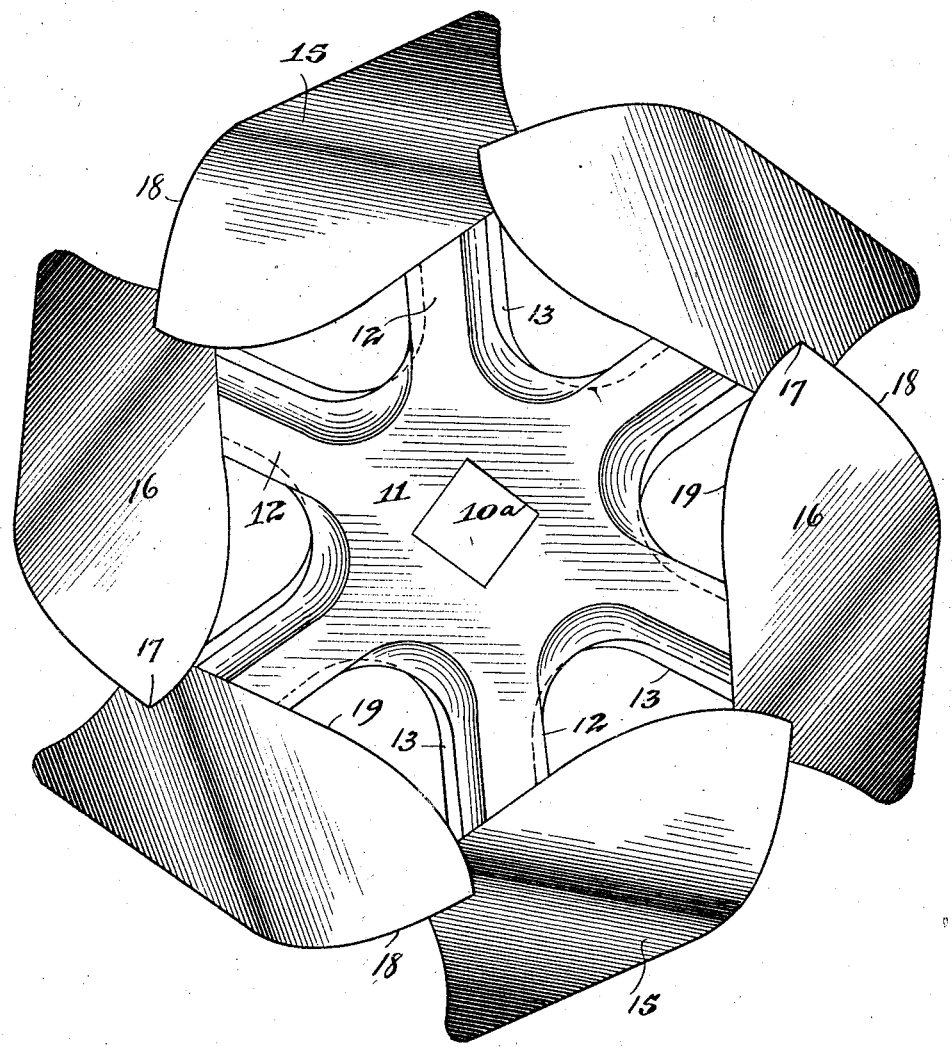

Figure 1 is a side elevational view of my improved cutter. Fig. 2 is a front end view thereof. Fig. 3 is an inner face view of one of the blades detached. Fig. 4 is an edge view of the blade shown in Fig. 3 looking in the direction indicated by the arrow. Fig. 5 is a transverse sectional view on the line 5 5 of Fig. 3 looking in the direction indicated by the arrow, and Fig. 6 is an end view of a modified form of a blade-carrying spider.

Referring to the drawings, 10 designates the axial driving-shaft, the outer end thereof being preferably squared, as shown at 10ª in Fig. 2, to receive the hub of the cutter-head. In the preferred form shown in Figs. 1 and 2 the spider of the head comprises an axially-bored hub 11, fitted to the squared end of the shaft 10 and provided with two series of radial arms 12 and 13, respectively. The companion arms of each pair of the series are not disposed parallel, but the arms of the rear series 13 are slightly back-set angularly to the arms of the forward series 12, and the arms of each pair are rigidly connected at their outer ends by a bevel-edged connection-plate 14, these last-described parts being in practice preferably formed of an integral casting.

15 designates as an entirety each of a series of blades secured to the several plates 14. These blades have the peculiar formation substantially as illustrated in Figs. 1 to 5, inclusive, of the drawings, wherein it will be seen that each blade is disposed at an acute angle to the longitudinal axis of the head and shaft and has its forward or advance end portion 16 bent quite sharply in the direction of rotation of the head, the blade being also by virtue of such bending warped or curled throughout its curved portion and terminating in a point 17, which lies substantially directly in advance of the rear edge of the immediately-preceding blade, as more clearly shown in Fig. 2. The forward or cutting edge of each blade (designated by 18) is inwardly bent, but lies throughout in a plane intersecting the longitudinal axis of the head and shaft and is formed of the requisite degree of sharpness, while the rear or inner discharging edge 19 of the blade is curved both inwardly and forwardly in the direction of rotation to the point 17 and may be made of greater thickness and rounded or blunt, as shown in Figs. 3, 4, and 5. The inner or rear portion of the rear edge of the blade lying behind its supporting-spider is preferably tapered off, as shown at 19ª, in a direction substantially parallel with the shaft 10. The inner face of each blade, as shown in the figures last referred to, is provided with a longitudinally-extending dovetailed groove 20, open at its rear end 20ª, whereby the blade may be slipped over and interlocked with the plate 14, being secured to the latter by a series of screws or bolts 21, as shown in Fig. 1.

The above-described construction of cutter-head leaves the forward or penetrating face of the cutter open, the curved and pointed end portions of the several blades being well separated from each other and the skeleton form of the spider permitting the free and easy discharge of the excavated material inwardly of the cutter-head. The twist or curl imparted to the forward or penetrating end portions of the blades creates a warped spoil-engaging surface on the inner faces of the blades, over and past which the spoil is crowded during the rotary and penetrating movement of the head, which is excellently adapted to the self-cleaning of the head, the angle of contact of the blades with the spoil changing so rapidly that the spoil is dislodged automatically from the blades and does not stick thereto and clog the head, to which latter result the unobstructed open spaces left between adjacent blades longitudinally of the cutter contribute also to a considerable degree. Furthermore, the described formation and relative positioning of the blades produces a screw-like action as the cutter-head is rotated, whereby it automatically penetrates the material to be excavated and eliminates the necessity for any thrust thereupon to maintain it in effective engagement with the material removed thereby. This screw-like action is facilitated by the fact that the penetrating points of the several blades are entirely free and unconnected, the spider being located so far rearwardly thereof as to offer practically no obstruction to the penetrating action. The entire cutter-head, including the knives, spider, and hub, are preferably made of steel, and the double-arm construction of the spider and hub affords great strength and rigidity and prevents the natural tendency of the blades to twist on the spider. The dovetailed detachable connection between said last-named parts, while consistent with the requirements as to rigidity, enables individual blades when broken or worn to be removed and substituted by new ones without discarding the entire head.

While the described double-arm construction of spider is preferred for the reasons above stated, yet it may within the purview of the invention be replaced by a construction employing a series of single arms to which the blades are attached. Such a construction is illustrated in Fig. 6, wherein 11$^a$ designates the hub and 12$^a$ a series of single radial arms extending therefrom, terminating in the connection-plates 14$^a$. When employing the single-arm spider last described, I preferably add thereto an annular brace 22, connecting the outer portions of the arms 12$^a$ just inwardly of the connection-pieces 14$^a$, which annular brace may be cast integral with or secured to said arms, as desired. A construction such as that shown and described in connection with Figs. 1 and 2, wherein the requisite strength and rigidity is obtained in the spider-arms alone, is preferred, however, because leaving a maximum of space between the several cutters and longitudinally of the cutter-head for the free discharge of the spoil.

From the foregoing it will be seen that my invention provides a powerful and efficient cutter for hydraulic dredges and similar purposes characterized as to its mode of operation by an automatic screw-like action, whereby it forces its own way into and through the material operated upon, and, further, by an automatic-loosening and freely-discharging action upon the material resulting from the peculiar warp or twist given to the blades, the freedom of their penetrating-points, and the ample space allowed for the discharge of spoil longitudinally of and through the head.

It is evident that the details of the described construction might be modified somewhat both in respect to the particular formation of the blades and their connection to the shaft without departing from the spirit or sacrificing any of the described advantages of the invention, and hence I do not limit the latter to such details, except to the extent that they are made the subject of specific claims.

I claim—

1. A rotary cutter of the character described comprising a hub adapted to be secured to the end of a rotary shaft, said hub having a series of radial arms, and a corresponding series of blades secured to the outer ends of said arms, said blades forwardly of said arms being warped and bent in the direction of rotation of the cutter, substantially as described.

2. A rotary cutter of the character described comprising a hub adapted to be secured to the end of a rotary shaft, said hub having a series of radial arms, and a corresponding series of blades secured to the outer ends of said arms, said blades lying at an angle to the longitudinal axis of the cutter and having their penetrating end portions warped and bent in the direction of rotation of the cutter, substantially as described.

3. A rotary cutter of the character described comprising a hub adapted to be secured to the end of a rotary shaft, said hub having a series of radial arms, and a corresponding series of blades secured to the outer ends of said arms, said blades lying at an angle to the longitudinal axis of the cutter and having sharp-pointed penetrating end portions which are warped and bent in the direction of rotation of the cutter, substantially as described.

4. A rotary cutter of the character described comprising a hub adapted to be secured to the end of a rotary shaft, said hub having a series of radial arms, a corresponding series of connection-plates on the outer ends of said arms, and a corresponding series of blades secured by their inner faces to said connection-plates, substantially as described.

5. A rotary cutter of the character described comprising a hub adapted to be secured to the end of a rotary shaft, said hub having a series of radial arms, a corresponding series of bevel-edged connection-plates on the outer ends of said arms, and a corresponding series of cutter-blades provided on their inner faces with dovetailed grooves engaging said connection-plates, substantially as described.

6. A rotary cutter of the character described comprising a hub adapted to be secured to the end of a rotary shaft, said hub having two series of radial arms disposed one in rear of the other on said hub, and a series of cutter-blades secured to the outer ends of each pair of front and rear arms, respectively, substantially as described.

7. A rotary cutter of the character described comprising a hub adapted to be secured to the end of a rotary shaft, said hub having two series of radial arms disposed one in rear of and angularly back-set relatively to the other, and a series of cutter-blades secured to the outer ends of each pair of front and rear arms, respectively, and disposed at an angle to the longitudinal axis of the cutter, substantially as described.

EZRA T. WILLIAMS.

Witnesses:
  H. A. DANCER,
  CLARA E. SKULS.